(12) United States Patent
Nakanishi et al.

(10) Patent No.: US 7,369,041 B2
(45) Date of Patent: May 6, 2008

(54) VEHICLE SURROUNDING DISPLAY DEVICE

(75) Inventors: Tomoya Nakanishi, Osaka (JP); Akira Ishida, Osaka (JP); Yutaka Watanabe, Osaka (JP); Toru Ichikawa, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 199 days.

(21) Appl. No.: 10/573,685

(22) PCT Filed: Apr. 21, 2005

(86) PCT No.: PCT/JP2005/007606

§ 371 (c)(1),
(2), (4) Date: Mar. 27, 2006

(87) PCT Pub. No.: WO2005/107261

PCT Pub. Date: Nov. 10, 2005

(65) Prior Publication Data

US 2007/0120656 A1 May 31, 2007

(30) Foreign Application Priority Data

Apr. 27, 2004 (JP) ............................. 2004-130989

(51) Int. Cl.
*B60Q 1/00* (2006.01)

(52) U.S. Cl. ............... 340/435; 340/932.2; 348/148; 701/300

(58) Field of Classification Search ............... 340/435
See application file for complete search history.

(56) References Cited

U.S. PATENT DOCUMENTS

| | | | | |
|---|---|---|---|---|
| 5,757,290 | A * | 5/1998 | Watanabe et al. | 340/988 |
| 6,172,601 | B1 * | 1/2001 | Wada et al. | 340/436 |
| 6,369,701 | B1 * | 4/2002 | Yoshida et al. | 340/435 |
| 6,477,260 | B1 * | 11/2002 | Shimomura | 340/435 |
| 6,583,403 | B1 * | 6/2003 | Koike et al. | 342/71 |
| 6,636,258 | B2 * | 10/2003 | Strumolo | 348/149 |
| 7,126,460 | B2 * | 10/2006 | Yamada | 340/435 |
| 7,218,758 | B2 * | 5/2007 | Ishii et al. | 340/988 |

(Continued)

FOREIGN PATENT DOCUMENTS

JP          7-17328          1/1995

(Continued)

*Primary Examiner*—Benjamin C. Lee
*Assistant Examiner*—Eric M. Blount
(74) *Attorney, Agent, or Firm*—Wenderoth, Lind & Ponack, L.L.P.

(57) ABSTRACT

A device displays images such that a driver can easily recognize an obstacle. The device includes a measurement for measuring a distance and direction to an obstacle, a comparison section for comparing the measured distance with a threshold value, a viewpoint determination section for determining a first viewpoint when the measured distance is larger than the threshold value and a second viewpoint based on the measured direction when the measured distance is not larger than the threshold value, an image generating section for generating an image representing an environment as seen from the first viewpoint when the first viewpoint is set and an image of a particular spot representing a view of the vehicle and the obstacle as seen from an area of the second viewpoint when the second viewpoint is set, and a display section for displaying the bird's eye image or the image of the particular spot.

14 Claims, 10 Drawing Sheets

U.S. PATENT DOCUMENTS

| | | |
|---|---|---|
| 7,230,524 B2 * | 6/2007 | Watanabe et al. ............ 340/435 |
| 7,307,655 B1 * | 12/2007 | Okamoto et al. ......... 348/222.1 |
| 2002/0044048 A1 * | 4/2002 | Watanabe et al. ............ 340/436 |
| 2003/0197660 A1 | 10/2003 | Takahashi et al. |
| 2007/0057816 A1 * | 3/2007 | Sakakibara et al. ....... 340/932.2 |

FOREIGN PATENT DOCUMENTS

| | | |
|---|---|---|
| JP | 2002-83284 | 3/2002 |
| JP | 2003-267171 | 9/2003 |
| JP | 2003-348574 | 12/2003 |

* cited by examiner

VEHICLE SURROUNDING DISPLAY DEVICE

TECHNICAL FIELD

The present invention relates to a vehicle surrounding display device, and more particularly to a vehicle surrounding display device which selectively displays at least two types of images in the vicinity of a vehicle, and informs a driver of a positional relationship between the vehicle and an obstacle.

BACKGROUND ART

Conventionally, a vehicle surrounding display device as described above (hereinafter, referred to as a conventional display device) includes a plurality of imaging devices, a plurality of laser range finders, a solid virtual section, an image converting section, and an image display section.

The plurality of imaging devices are mounted on a vehicle 1 and these imaging devices image an environment in the vicinity of the vehicle 1. The plurality of laser range finders measure distances to objects within view fields (subjects of the imaging device) from the laser range finders. One imaging device and one laser range finder are disposed in the vicinity of each other.

The solid virtual section is operable to obtain a distance image (see an upper left image of FIG. 18) within the view field based on distance information from the laser range finder, and to recognize objects within the view field based on an original image (see an upper right image of FIG. 18) imaged by the aforementioned imaging device. Based on the two pieces of image information which are the original image and the distance image, and the information about the recognized objects, a three-dimensional field of view is reproduced by simulating an invisible portion of the objects, which cannot be captured by the imaging device.

The three-dimensional information reproduced by solid virtual means is sent to the image converting section. As shown in a lower image of FIG. 18, based on the received three-dimensional information, the image converting section generates a bird's eye view which appears to be imaged by a virtual camera which is set to be virtually mounted above the vehicle. The bird's eye view represents a view of the vehicle and its surroundings seen from an appropriate viewpoint at the side of the vehicle, and is displayed by the image display section.

Alternatively, viewpoints for the bird's eye view are set at two points diagonal to the upper right and the upper left of the vehicle, respectively. The bird's eye view imaged from either viewpoint is selectively displayed. In this case, the viewpoints for the bird's eye view are switched to each other in accordance with a steering angle of the vehicle.

[Patent document 1] Japanese Laid-Open Patent Publication 7-17328

DISCLOSURE OF THE INVENTION

Problems to be Solved by the Invention

As described above, the conventional display device displays a bird's eye view seen from a virtual camera which is set to be virtually mounted above a vehicle. Therefore, when the vehicle comes in close proximity to an obstacle, the obstacle will enter a dead zone generated by the vehicle, whereby there has been a problem that a driver has a difficulty in visually recognizing the obstacle.

Thus, an object of the present invention is to provide a vehicle surrounding display device capable of displaying images such that a driver can visually recognize an obstacle more easily.

Solution to the Problems

To achieve the above objects, a first aspect of the present invention is directed to a vehicle surrounding display device which selectively displays at least two types of images in a vicinity of a vehicle. The vehicle surrounding display device comprises a measurement section for measuring a distance and a direction from the vehicle to an obstacle in the vicinity of the vehicle; a comparison section for comparing the distance measured by the measurement section with a predetermined threshold value; a viewpoint determination section for determining a predetermined first viewpoint when a comparison result generated by the comparison section indicates that the measured distance is larger than the threshold value, and for determining a second viewpoint based on the direction measured by the measurement section when the comparison result generated by the comparison section indicates that the measured distance is not larger than the threshold value; an image generating section for generating, when receiving the first viewpoint from the viewpoint determination section, a first image representing a view in the vicinity of the vehicle as seen from the received first viewpoint, and for generating, when receiving the second viewpoint from the viewpoint determination section, a second image representing a view of the vehicle and the obstacle as seen from an area in the vicinity of the received second viewpoint; and a display section for displaying one of the first image and the second image generated by the image generating section.

A second aspect of the present invention is directed to a vehicle surrounding display method for causing a display device to selectively display at least two types of images in a vicinity of a vehicle. The vehicle surrounding display method comprises a measurement step of measuring a distance and a direction from the vehicle to an obstacle in the vicinity of the vehicle; a comparison step of comparing the distance measured by the measurement section with a predetermined threshold value; a first viewpoint determination step of determining a predetermined first viewpoint when a result received from the comparison step indicates that the measured distance is larger than the threshold value; a first image generating step of generating a first image representing a view in the vicinity of the vehicle as seen from the first viewpoint determined by the first viewpoint determination step; a first display step of displaying the first image generated by the first image generating step; a second viewpoint determination step of determining a second viewpoint based on the distance measured by the measurement step when a result received from the comparison step indicates that the measured distance is not larger than the threshold value; a second image generating step of generating a second image representing a view of the vehicle and the obstacle as seen from an area in the vicinity of the second viewpoint determined by the second viewpoint determination step; and a second display step of displaying the second image generated by the second image generating step.

A third aspect of the present invention is directed to a computer program for causing a display device to selectively display at least two types of images in a vicinity of a vehicle. The computer program comprises a measurement step of measuring a distance and a direction from the vehicle to an obstacle in the vicinity of the vehicle; a comparison step of comparing the distance measured by the measurement section with a predetermined threshold value; a first viewpoint determination step of determining a predetermined first viewpoint when a result received from the comparison step indicates that the measured distance is larger than the threshold value; a first image generating step of generating a first image representing a view in the vicinity of the vehicle as seen from the first viewpoint determined by the first viewpoint determination step; a first display step of displaying the first image generated by the first image generating step; a second viewpoint determination step of determining a second viewpoint based on the distance measured by the measurement step when a result received from the comparison step indicates that the measured distance is not larger than the threshold value; a second image generating step of generating a second image representing a view of the vehicle and the obstacle as seen from an area in the vicinity of the second viewpoint determined by the second viewpoint determination step; and a second display step of displaying the second image generated by the second image generating step.

In the respective aspects described above, the first viewpoint and the second viewpoint are represented by three-dimensional coordinate values, respectively, a horizontal direction component of the second viewpoint is larger than a horizontal direction component of the first viewpoint, and a vertical direction component of the second viewpoint is smaller than a vertical direction component of the first viewpoint.

In the respective aspects described above, the three-dimensional coordinates of the first viewpoint are set at a point which is above the vehicle, and the three-dimensional coordinates of the second viewpoint are set at a point having a predetermined depression angle which is formed between the horizontal plane and a line extending from the second viewpoint in a direction of the vehicle and the obstacle.

In the respective aspects described above, the second viewpoint is set at a point contained in a vertical plane orthogonal to a line between the vehicle and the obstacle.

In the respective aspects described above, the vertical plane is a plane which perpendicularly bisects the line between the vehicle and the obstacle.

In the respective aspects described above, whether the vehicle is capable of moving without contacting the obstacle is determined. When it is determined that the vehicle is capable of moving without contacting the obstacle, a display section displays a third image different from the second image.

In one example, a height of the obstacle is measured, and whether the vehicle is capable of moving without contacting the obstacle is determined based on the measured height of the obstacle.

In another example, a steering angle of the vehicle is detected, and whether the vehicle is capable of moving without contacting the obstacle is determined based on the detected steering angle of the vehicle.

In the above example, when it is determined that the vehicle is capable of moving without contacting the obstacle, the second viewpoint is determined additionally based on the detected steering angle. In this case, the second viewpoint is preferably set at three-dimensional coordinate values such that a driver can visually recognize both the obstacle and a spot, on the vehicle, which contacts the obstacle.

When a plurality of distances and directions of obstacles are measured, one distance and one direction, which are most likely to contact the vehicle, are preferably selected. In this case, the selected distance and direction are compared with predetermined threshold values. When a comparison result indicates that the measured distance is not larger than the threshold value, the second viewpoint is determined based on the selected direction.

A plurality of active sensors are mounted at any of a front part, a rear part, a right side part or a left side part of the vehicle, whereby an obstacle in the vicinity of the vehicle is detected.

Effect of the Invention

According to the respective aspects described above, a distance and a direction from a vehicle to an obstacle are measured. When the measured distance is not larger than a predetermined threshold value, i.e., the vehicle and the obstacle are in close proximity to each other, the second image data representing a view of the vehicle and the obstacle as seen from an area in the vicinity of the second viewpoint determined based on the measured direction is generated and displayed. Since the second viewpoint is set as such, the obstacle is less likely to enter a dead zone generated by the vehicle in the second image data. Therefore, it becomes possible to provide a vehicle surrounding display device capable of displaying images such that the driver can more easily visually recognize an obstacle.

These and other objects, features, aspects and advantages of the present invention will become more apparent from the following detailed description of the present invention when taken in conjunction with the accompanying drawings.

BRIEF DESCRIPTION OF THE DRAWINGS

FIG. 1 is a schematic diagram illustrating a block configuration of a vehicle surrounding display device 1 according to an embodiment of the present invention.

FIG. 2 is a schematic diagram illustrating exemplary arrangements of active sensors 111 included in a measurement section 11 shown in FIG. 1.

FIG. 3 is a schematic diagram illustrating contents of data stored in a data accumulating section 16 shown in FIG. 1.

FIG. 4 is a flowchart illustrating an operation of the vehicle surrounding display device 1 shown in FIG. 1.

FIG. 5 is a schematic diagram illustrating obstacles B existing in areas which are in front, rear or either side of a vehicle A shown in FIG. 1.

FIG. 6A is an enlarged view of the active sensors 111 and the obstacle $B_2$, both shown in FIG. 2, as seen from thereabove.

FIG. 6B is an enlarged view of the active sensor 111 and the obstacle $B_2$, both shown in FIG. 6A, as seen from a side thereof.

FIG. 7 is a schematic diagram for describing a method of deriving a distance C when an obstacle B exists in any of areas which are diagonally across the vehicle A shown in FIG. 1 from each other.

FIG. 8A is a schematic diagram of second viewpoints $P_2$, determined by a viewpoint determination section 13 shown in FIG. 1, seen from thereabove.

FIG. 8B is a schematic diagram of the second viewpoints $P_2$, determined by the viewpoint determination section 13 shown in FIG. 1, viewed from therebehind.

FIG. 9 is a schematic diagram of the second viewpoints $P_2$, determined by the viewpoint determination section 13 shown in FIG. 1, viewed from thereabove, when the obstacle B exists in any of the areas which are diagonally across the vehicle A shown in FIG. 1 from each other.

FIG. 10 is a schematic diagram illustrating an image of a particular spot displayed in a display section 15 shown in FIG. 1.

FIG. 11 is a schematic diagram illustrating a bird's eye image displayed in the display section 15 shown in FIG. 1.

FIG. 12 is schematic diagram illustrating a block configuration of a vehicle surrounding display device 1a according to a first variant of the present invention.

FIG. 13 is a flowchart illustrating an operation of the vehicle surrounding display device 1a shown in FIG. 1.

FIG. 14 is a schematic diagram illustrating a height $H_B$ derived by a contact determination section 21 shown in FIG. 12.

FIG. 15 is a schematic diagram illustrating a block configuration of a vehicle surrounding display device 1b according to a second variant of the present invention.

FIG. 16 is a flowchart illustrating an operation of the vehicle surrounding display device 1b shown in FIG. 15.

FIG. 17A is a first schematic diagram illustrating a preferable second viewpoint $P_2$ determined by the viewpoint determination section 13 shown in FIG. 15.

FIG. 17B is a second schematic diagram illustrating the preferable second viewpoint $P_2$ determined by the viewpoint determination section 13 shown in FIG. 15.

FIG. 18 is a schematic diagram illustrating an outline process of a conventional vehicle surrounding display device.

Figure 1:
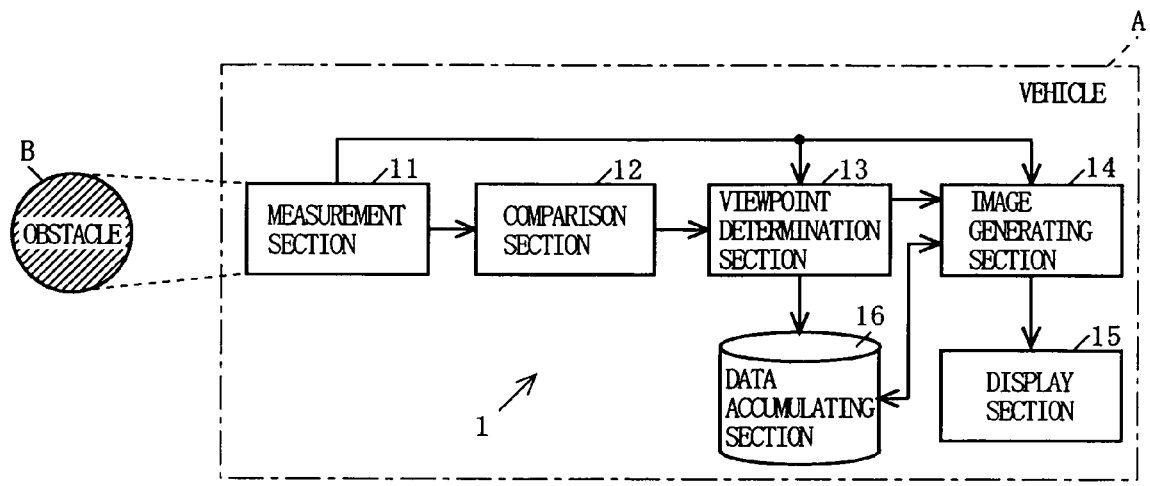
[FIG. 1]

DESCRIPTION OF THE REFERENCE CHARACTERS 1, 1a, 1b . . . vehicle surrounding display device
11 . . . measurement section
12 . . . comparison section
13 . . . viewpoint determination section
14 . . . image generating section
15 . . . display section
16 . . . data accumulating section
21, 32 . . . contact determination section
31 . . . steering angle sensor

BEST MODE FOR CARRYING OUT THE INVENTION

Embodiment

FIG. 1 is a schematic diagram illustrating an example of a block configuration of a vehicle surrounding display device 1 according to an embodiment of the present invention. In FIG. 1, the vehicle surrounding display device 1 is mounted on a vehicle A. The vehicle surrounding display device 1 includes a measurement section 11, a comparison section 12, a viewpoint determination section 13, an image generating section 14, and a display section 15. Preferably, the vehicle surrounding display device 1 also includes a data accumulating section 16.

Figure 2:
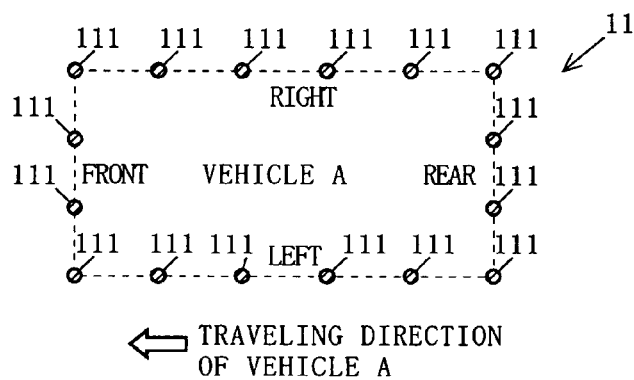
[FIG. 2]

The measurement section 11 measures at least a distance C and a direction D from the vehicle A to an obstacle B in the vicinity of the vehicle. For such a measurement, in the present embodiment, as shown in FIG. 2, the measurement section 11 includes a plurality of active sensors 111 (16 such active sensors are illustrated in FIG. 2). The active sensors 111 are typically laser radars, millimeter wave radars, or quasi-millimeter wave radars. Each of the active sensors 111 scans within a range of approximately plus minus 45 degrees horizontally, and scans within a range of approximately plus minus 20 degrees vertically, thereby detecting the obstacle B existing within a detected range of the sensor. As shown in FIG. 2, the vehicle A has four active sensors 111 positioned in a front part, a rear part, a right side part and a left side part, respectively, such that the obstacle B within 360 degrees of the vehicle A can be detected.

The comparison section 12 compares the distance C measured by the measurement section 11 with a previously stored threshold value E, and generates a comparison result F. Note that the threshold value E is a reference value to determine whether the vehicle A comes in close proximity to the obstacle B. In the present embodiment, when the measured distance C is larger than the threshold value E, the comparison result F is "$F_T$"; and when the measured distance C is not larger than the threshold value E, the comparison result F is "$F_F$".

When the comparison result F received from the comparison section 12 indicates "$F_T$", the viewpoint determination section 13 determines a first viewpoint $P_1$, to allow a driver to see the vehicle A from above. On the other hand, when the received comparison result F indicates "$F_F$", the viewpoint determination section 13 determines, based on the direction D measured by the measurement section 11, a second viewpoint $P_2$ to allow the driver to visually recognize a particular spot on the vehicle A.

When the image generating section 14 receives the first viewpoint $P_1$ from the viewpoint determination section 13, the image generating section 14 generates first image data $I_a$ representing an environment in the vicinity of the vehicle A as seen from the first viewpoint $P_1$. On the other hand, when the image generating section 14 receives the second viewpoint $P_2$ from the viewpoint determination section 13, the image generating section 14 generates second image data $I_b$ representing a spot, on the vehicle A, which is likely to contact the obstacle B as seen from the second viewpoint $P_2$.

The comparison section 12, viewpoint determination section 13 and image generating section 14 typically include a combination of a CPU, a ROM, and a RAM, and the processes performed by each section are realized by causing the CPU to execute a computer program stored in the ROM by means of the RAM.

When the display section 15 receives the first image data $I_a$ from the image generating section 14, the display section 15 displays a bird's eye image of the vehicle A based on the received data. On the other hand, when the display section 15 receives the second image data $I_b$ from the image generating section 14, the display section 15 displays an image of a particular spot on the vehicle A based on the received second image data $I_b$. By such a display process, the bird's eye image of the vehicle A based on the first image data $I_a$ and the image of the particular spot on the vehicle A based on the second image data $I_b$ are provided to a driver of the vehicle A. For such a display process, the display section 15 is applicable to an on-vehicle navigation system, a monitor mounted with a television receiver, a head-up display, or a head-mounted display.

Figure 3:
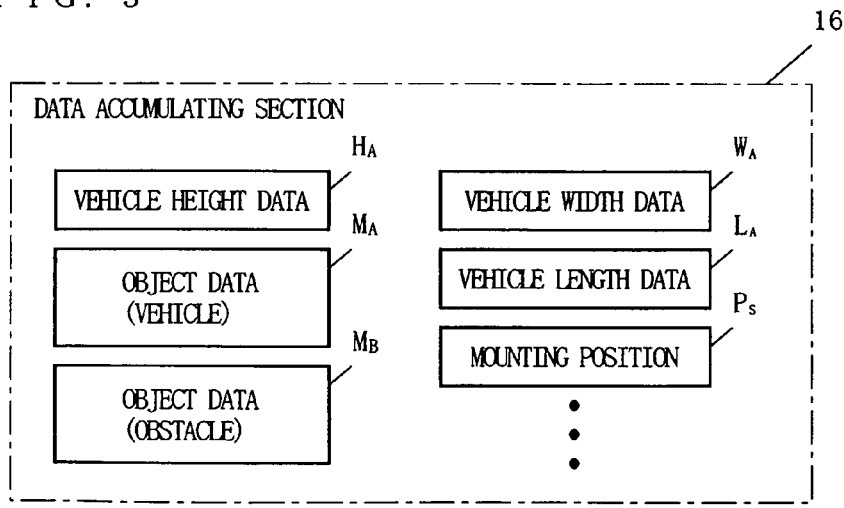
[FIG. 3]

The data accumulating section 16 typically includes an HDD (Hard Disc Drive), a DVD (Digital Versatile Disc), or a semiconductor memory. As shown in FIG. 3, the data accumulating section 16 stores a variety of data. Firstly, a height $H_A$ of the vehicle A (hereinafter, referred to as vehicle height data), and object data $M_A$ representing an outer shape of the vehicle A are stored. In addition, the data accumulating section 16 also stores a width $W_A$ of the vehicle A (hereinafter, referred to as vehicle width data), and an overall length $L_A$ of the vehicle A (hereinafter, referred to as vehicle length data).

Furthermore, the data accumulating section 16 stores a mounting position $P_S$ of each active sensor 111. Each mounting position $P_S$ of the corresponding active sensor 111 is represented by a vertical distance from the ground, a distance from any of corners of the vehicle A, and the like. Still furthermore, the data accumulating section 16 also stores object data $M_B$ representing an outer shape of an object such as a person, a wall or a tree, which may become an obstacle B.

The variety of data stored in the aforementioned data accumulating section 16 is mainly used for generating the first image data $I_a$ and the second image data $I_b$.

Figure 4:
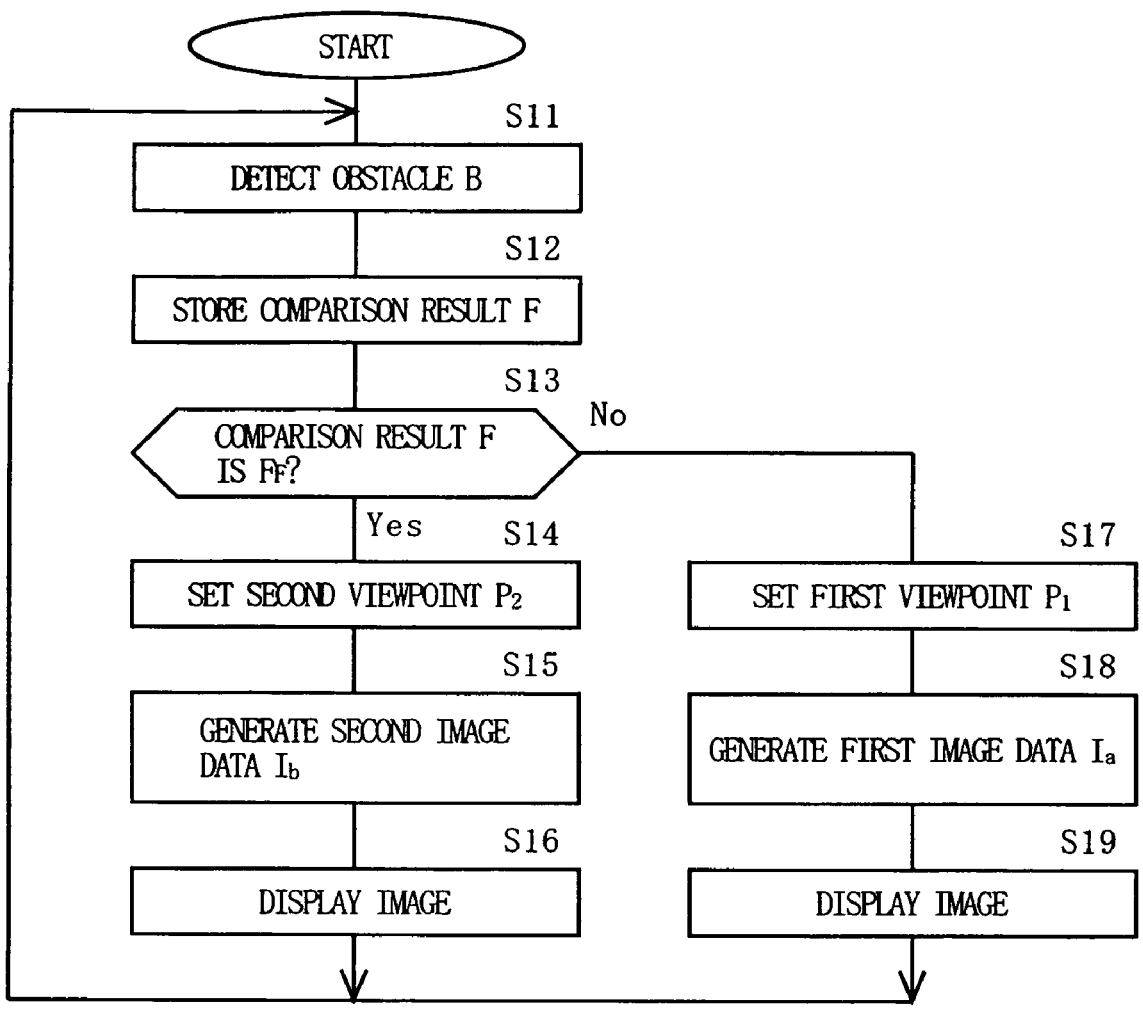
[FIG. 4]

Next, referring to a flowchart of FIG. 4, an operation of the vehicle surrounding display device 1 shown in FIG. 1 is described. When there is the obstacle B in the vicinity of the vehicle A, the measurement section 11 detects the obstacle B (step S11). Specifically, the measurement section 11 derives a distance C and a direction D from the vehicle A to the obstacle B. Furthermore, the measurement section 11 predicts what the currently detected obstacle B may be, thereby obtaining a predicted result G.

Figure 5:
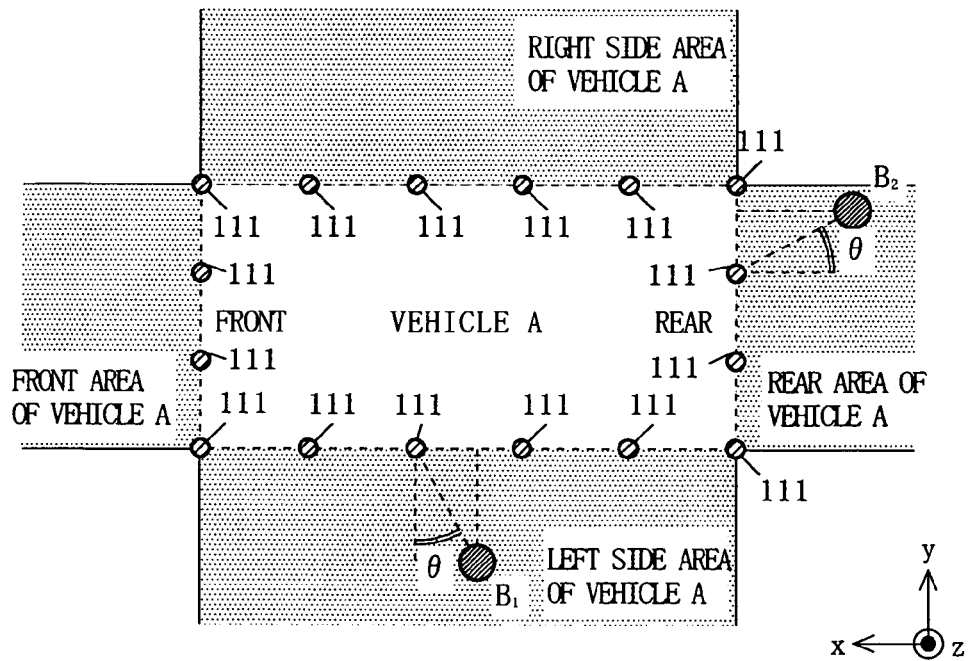
[FIG. 5]
Figure 6A:
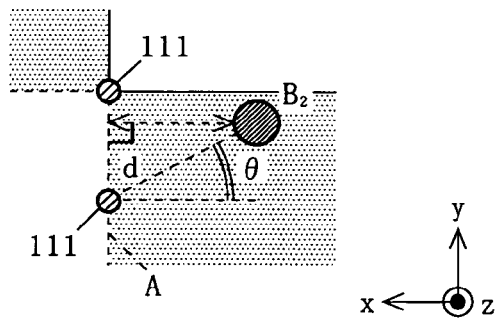
[FIG. 6A]
Figure 6B:
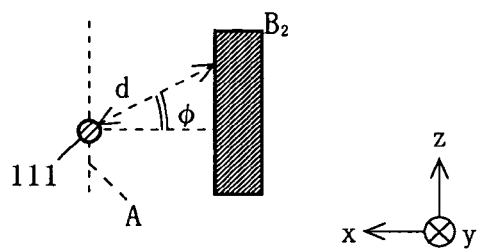
[FIG. 6B]

Referring to FIGS. 5, 6A, and 6B, a method of deriving the distance C is described. FIG. 5 is a schematic diagram illustrating the obstacles B existing in areas which are in front, rear or either side of the vehicle A (shown hatched). FIG. 5 typically illustrates the vehicle A seen from above. FIG. 5 also exemplifies a case where there are an obstacle $B_1$ in the left side of the vehicle A and an obstacle $B_2$ in the rear of the vehicle A.

Each of the obstacles $B_1$ and $B_2$, and the active sensor 111 (hereinafter, referred to as an adjacent active sensor) positioned closest to the obstacle have a positional relationship therebetween as shown in FIGS. 6A and 6B. FIG. 6A is an enlarged view of the adjacent active sensor 111 and the obstacle $B_1$ (or $B_2$) as seen from thereabove. FIG. 6B is an enlarged view of the active sensors 111 and the obstacle $B_1$ (or $B_2$), both shown in FIG. 6A, as seen from a side thereof.

As shown in FIGS. 6A and 6B, the adjacent active sensor 111 detects a distance d, an azimuth angle $\theta$ and an elevation angle $\phi$, between the active sensor 111 and the obstacle $B_1$ (or $B_2$). In order to obtain a closest distance C between the adjacent active sensor 111 and the obstacle $B_1$ (or $B_2$), the measurement section 11 substitutes the distance d, the azimuth angle $\theta$ and the elevation angle $\phi$ into $c = d \cdot \cos \theta \cdot \cos \phi$. The direction D toward the vehicle A is typically represented by both of the azimuth angle $\theta$ and the elevation angle $\phi$ between the vehicle A and the adjacent active sensor 111.

Figure 7:
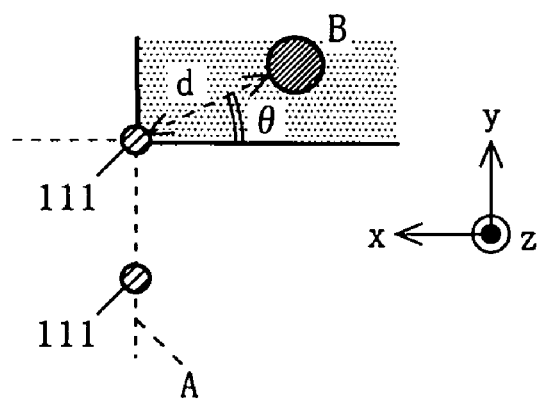
[FIG. 7]

FIG. 7 is a schematic diagram for describing a method of deriving a distance C, when an obstacle B exists in any of areas which are diagonally across the vehicle A from each other (shown hatched) and no obstacle B exists in front, rear, and either side of the vehicle A. FIG. 7 typically illustrates the vehicle A and the obstacle B both seen from above. FIG. 7 also exemplifies a case where there is the obstacle B in the right rear of the vehicle A.

In the above case, an active sensor 111 in the left rear of the vehicle A is an adjacent active sensor 111. In this case, similarly to above, the adjacent active sensor 111 detects a distance d, an azimuth angle $\theta$ and an elevation angle $\phi$, between the active sensor 111 and the obstacle B. Therefore, a closest distance C and the azimuth angle $\phi$ are obtained by the measurement section 11 in a similar manner as described above. On the other hand, since the adjacent active sensor 111 is mounted diagonally rearward from the vehicle A, the azimuth angle $\theta$ is converted into a direction D to the vehicle A by means of a mounting position of the adjacent active sensor 111 stored in the data accumulating section 16.

Moreover, the obstacle B can be predicted, for example, based on the intensity of reflected waves to that of outgoing waves of the active sensors 111, irrespective of an area in which the obstacle B exits.

The distance C, the direction D and the predicted result G, which have been all obtained thereby, are stored in the RAM.

Next, the comparison section 12 compares the distance C stored in the RAM with the threshold value E stored in the comparison section 12, and stores the comparison result F in the RAM (step S12). Specifically, when the distance C is larger, the comparison result "$F_T$" is stored in the RAM; and when the distance C is not larger, the comparison result "$F_F$" is stored in the RAM. As described above, the threshold value E is a reference value to determine whether the vehicle A comes in close proximity to the obstacle B. The threshold value E1 is selected, for example, at 1 meter. However, this value may be changed in accordance with a designation of a driver or a design specification of the vehicle surrounding display device 1. Based on such a threshold value E, the comparison result F indicates whether the obstacle B exists in the vicinity of the vehicle A.

Next, the viewpoint determination section 13 determines whether the comparison result F stored in the RAM is "$F_F$" (step S13). If it is determined Yes, it indicates that the vehicle A has already come in close proximity to the obstacle B. Thus, in this case, the viewpoint determination section 13 determines the second viewpoint $P_2$ so as to show a particular spot (step S14).

Hereinafter, a detailed exemplary process performed in step S15 is described. Firstly, the viewpoint determination section 13 uses the direction D currently stored in the RAM to determine the second viewpoint $P_2$. Therefore, the viewpoint determination section 13 can identify a direction of an area including the obstacle B as seen from the vehicle A. Furthermore, the second viewpoint $P_2$ is set at three-dimensional coordinate values obtained when depression angles R have predetermined values (e.g., 45 degrees) with respect to the horizontal plane, such that a spot in the vicinity of the adjacent sensor 111 (i.e., a spot on the vehicle A which is highly likely to contact the obstacle B) will appear as an image of a particular spot. The depression angle R is an angle between the horizontal plane and a line extending from the second viewpoint $P_2$ to the horizontal plane, and the line must extend in a direction of the adjacent active sensor 111 or its detecting range. A value of the depression angle R may be changed in accordance with a designation of a driver or a design specification of the vehicle surrounding display device 1.

Figure 8A:
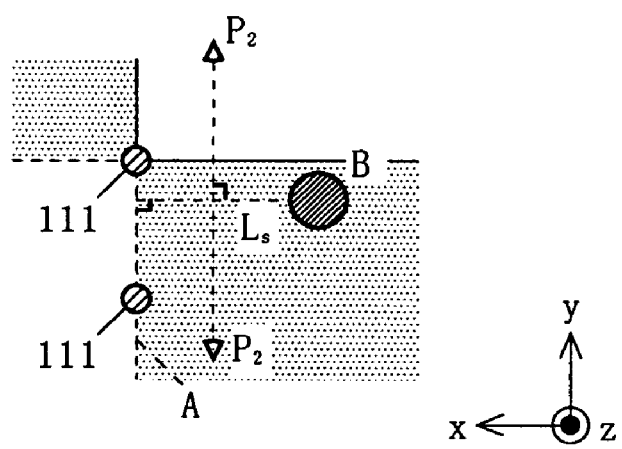
[FIG. 8A]
Figure 8B:
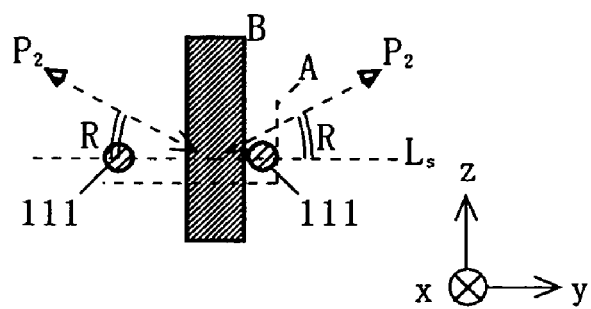
[FIG. 8B]
Figure 9:
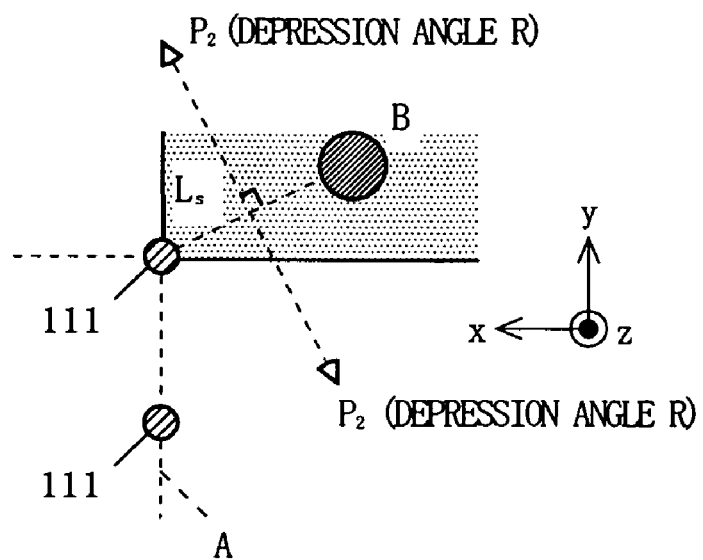
[FIG. 9]

The viewpoint determination section 13 preferably uses, in addition to the direction D, the distance C currently stored in the RAM so as to determine the second viewpoint $P_2$. In this case, as shown in FIGS. 8A and 8B, the second viewpoints $P_2$ are respectively set at three-dimensional coordinate values contained in a vertical plane $P_V$ orthogonal to a line $L_S$ representing a shortest distance between the vehicle A and the obstacle B, the three-dimensional coordinate values obtained when depression angles R are predetermined values with respect to the horizontal plane. More preferably, the vertical plane $P_V$ is a plane which perpendicularly bisects the line $L_S$. In FIG. 9, the respective second viewpoints $P_2$ are indicated when the obstacle B exists in any of areas which are diagonally across the vehicle A from each other (shown hatched).

The viewpoint determination section 13 passes the second viewpoint $P_2$ set as described above to the image generating section 14. When receiving the second viewpoint $P_2$, the image generating section 14 generates second image data $I_b$ (step S15). Firstly, the object data $M_B$ representing the obstacle B and the object data $M_A$ representing the vehicle A, which have been both detected so as to correspond with the predicted result G stored in the data accumulating section 16, are retrieved. Next, the image generating section 14 places an object representing the obstacle B and an object representing the vehicle A in such a positional relationship as to contain the distance C and the direction D therebetween, both stored in the RAM. Thereafter, the image generating section 14 generates the second image data $I_b$ representing a view of the both objects as seen from the received second viewpoint $P_2$. Preferably, a numerical value indicating the distance C between the obstacle B and the vehicle A, and a numerical value indicating a height $H_B$ of the obstacle are also incorporated into the second image data $I_b$.

Figure 10:
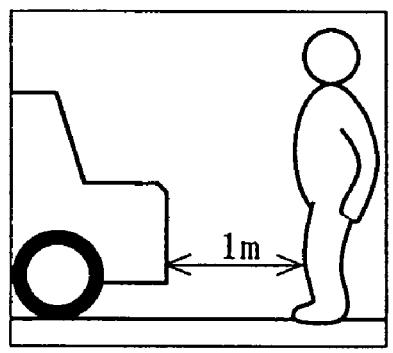
[FIG. 10]

The image generating section 14 forwards the second image data $I_b$ generated thereby to the display section 15. As shown in FIG. 10, the display section 15 displays an image of a particular spot based on the second image data $I_b$ (step S16). Thereafter, a process returns to step S11.

If it is determined No in step S13, the viewpoint determination section 13 determines that the vehicle A has not yet come in close proximity to the obstacle B, and determines the first viewpoint $P_1$ (step S17).

In the present embodiment, the first viewpoint $P_1$ is set above the vehicle A. Here, it is assumed that the first viewpoint $P_1$ is denoted by three-dimensional coordinate values $(0, 0, z_1)$, and the second viewpoint $P_2$ is denoted by three-dimensional coordinate values $(x_2, y_2, z_2)$, respectively. The second image data $I_b$ (i.e., the second viewpoint $P_2$) is required for a driver to more easily visually recognize a spot, on the vehicle A, which is likely to contact the obstacle B. Thus, from an origin point, a vertical direction component of the first viewpoint $P_1$ (i.e., $|z_1|$) is set larger than a vertical direction component of the second viewpoint $P_2$ (i.e., $|z_2|$). Furthermore, for the above requirement, the second viewpoint $P_2$ needs to be horizontally displaced from the first viewpoint $P_1$. Therefore, from the origin point, a horizontal direction component of the first viewpoint $P_1$ is set smaller than a horizontal direction component of the second viewpoint $P_2$ (i.e., $\sqrt{(x_2^2+y_2^2)}$).

The viewpoint determination section 13 passes the first viewpoint $P_1$ set as described above to the image generating section 14. When receiving the first viewpoint $P_1$, the image generating section 14 generates first image data $I_a$ (step S18). The first image data $I_a$ is generated in a similar manner to the second image data $I_b$. However, a viewpoint for the first image data $I_a$ is different from that of the second image data $I_b$. Similarly to the second image data $I_b$, a numerical value indicating the distance C between the vehicle A and the obstacle B, and a numerical value indicating a height $H_B$ of the obstacle B may be incorporated into the first image data $I_a$.

Figure 11:
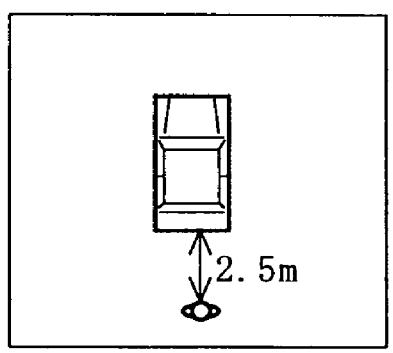
[FIG. 11]

The image generating section 14 forwards the first image data $I_a$ generated thereby to the display section 15. As shown in FIG. 11, the display section 15 displays a bird's eye image based on the first image data $I_a$ (step S19). Thereafter, a process returns to step S11.

By the above process, when the obstacle B comes in close proximity to the vehicle A or the vehicle A comes in close proximity to the obstacle B, and the distance C between the vehicle A and the obstacle B is larger than the threshold value E, an bird's eye image based on the first image data $I_a$ is displayed in the display section 15. Since the bird's eye image represents an environment in the vicinity of the vehicle A as seen above the vehicle A, a driver can substantially understand the situation in the vicinity of the vehicle.

On the other hand, the distance C between the vehicle A and the obstacle B becomes not larger than the threshold value E, an image of a particular spot based on the second image data $I_b$ is displayed in the display section 15. The second viewpoint $P_2$, which has been set based on the detected direction D of the obstacle B, is used for generating the image of the particular spot. The image of the particular spot represents an enlarged view of a spot, on the vehicle A, in the vicinity of the adjacent active sensor 111 which has detected the obstacle B, whereby the obstacle B will be less likely to enter a dead zone. As a result, the driver can more easily visually recognize a spot, on the vehicle A, which may be highly likely to contact the obstacle B.

Furthermore, by using not only the direction D but also the distance C for the second viewpoint $P_2$, it becomes possible to generate the second image data $I_b$ representing the image of the particular spot such that the driver can more easily visually recognize a positional relationship between the vehicle A and the obstacle B.

Specifically, as shown in FIGS. 8A, 8B, and 9, the second viewpoint $P_2$ is preferably set at three-dimensional coordinate values contained in a vertical plane $P_V$ orthogonal to a line $L_S$ representing a shortest distance between the vehicle A and the obstacle B, the three-dimensional coordinate values obtained when a depression angle R is a predetermined value with respect to the horizontal plane. More preferably, the vertical plane $P_V$ is a plane which perpendicularly bisects the line $L_S$. The second viewpoint $P_2$ is set in such a manner as described above, whereby both of the adjacent active sensor 111 and the obstacle B are likely to appear as the image of the particular spot. Thus, it becomes possible to provide a vehicle surrounding display device capable of displaying an image of a particular spot such that a driver can more easily visually recognize a positional relationship between the vehicle A and the obstacle B. Moreover, indicating the distance C in the display section 15 allows the driver to understand the positional relationship between the vehicle A and the obstacle B more easily.

The above embodiment illustrates an example where the first image data $I_a$ and the second image data $I_b$ are both generated on the basis of the object data $M_A$ stored in the data accumulating section 16, and if necessary, the object data $M_B$ is also used for generating the data. However, the present invention is not limited thereto. The data similar to the first image data $I_a$ or the second image data $I_b$ may be generated by means of images imaged by imaging devices mounted at a front part, a rear part or either side part of the vehicle A, respectively.

There may be a case where the measurement section 11 detects a plurality of obstacles B. In such a case, the aforementioned process is preferably applied to one of the obstacles B, which exists in the traveling direction of the vehicle A and which is closest to the vehicle A.

(First Variant)

Figure 12:
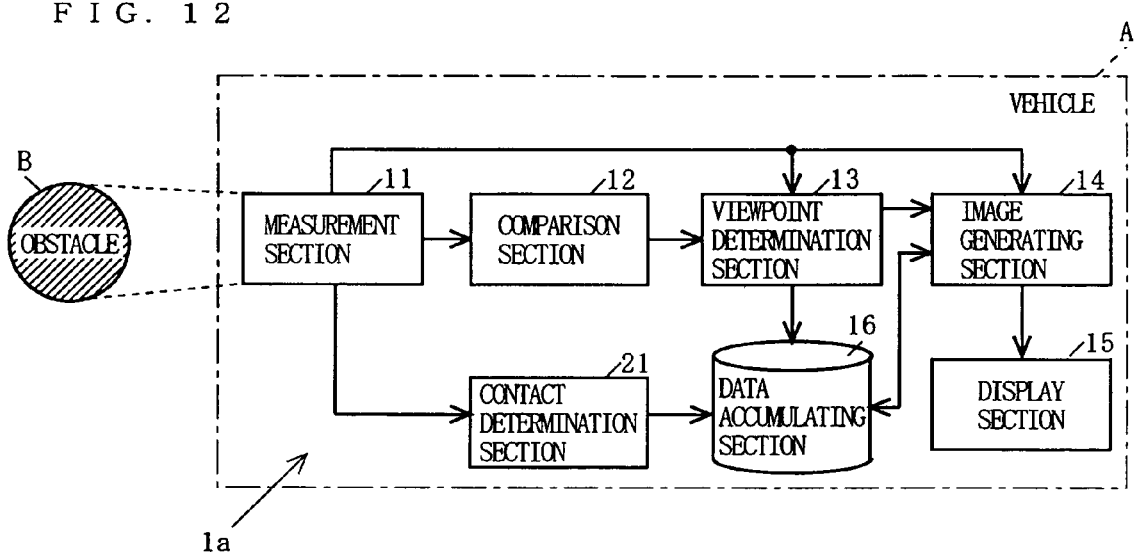
[FIG. 12]

FIG. 12 is a schematic diagram illustrating an example of a block configuration of the vehicle surrounding display device 1 according to a first variant (hereinafter, referred to as a vehicle surrounding display device 1a) of the present invention. In FIG. 12, the vehicle surrounding display device 1a is different from the vehicle surrounding display device 1 shown in FIG. 1 in that the vehicle surrounding display device 1a further includes a contact determination section 21. There are no other differences between the vehicle surrounding display devices 1 and 1a. Therefore, in FIG. 12, like elements corresponding to those of FIG. 1 are denoted by like reference numerals, and the descriptions thereof are omitted.

The contact determination section 21 derives a height $H_B$ from the ground to the bottom of the obstacle B, and compares the height $H_B$ with a height $H_A$ of the vehicle A (hereinafter, referred to as vehicle height data) stored in the data accumulating section 16 to be described below. Then, the contact determination section 21 determines whether the vehicle A can pass under the obstacle B, and generates a determination result J. In the present embodiment, when the height $H_B$ is larger than the vehicle height data $H_A$, the contact determination section 21 determines that the vehicle A can pass through. In this case, the determination result J is "$J_T$". On the other hand, when the height $H_B$ is not larger than the vehicle height data $H_A$, the determination result J is "$J_F$".

The above contact determination section 21 also typically includes a combination of the CPU, the ROM, and the RAM.

Figure 13:
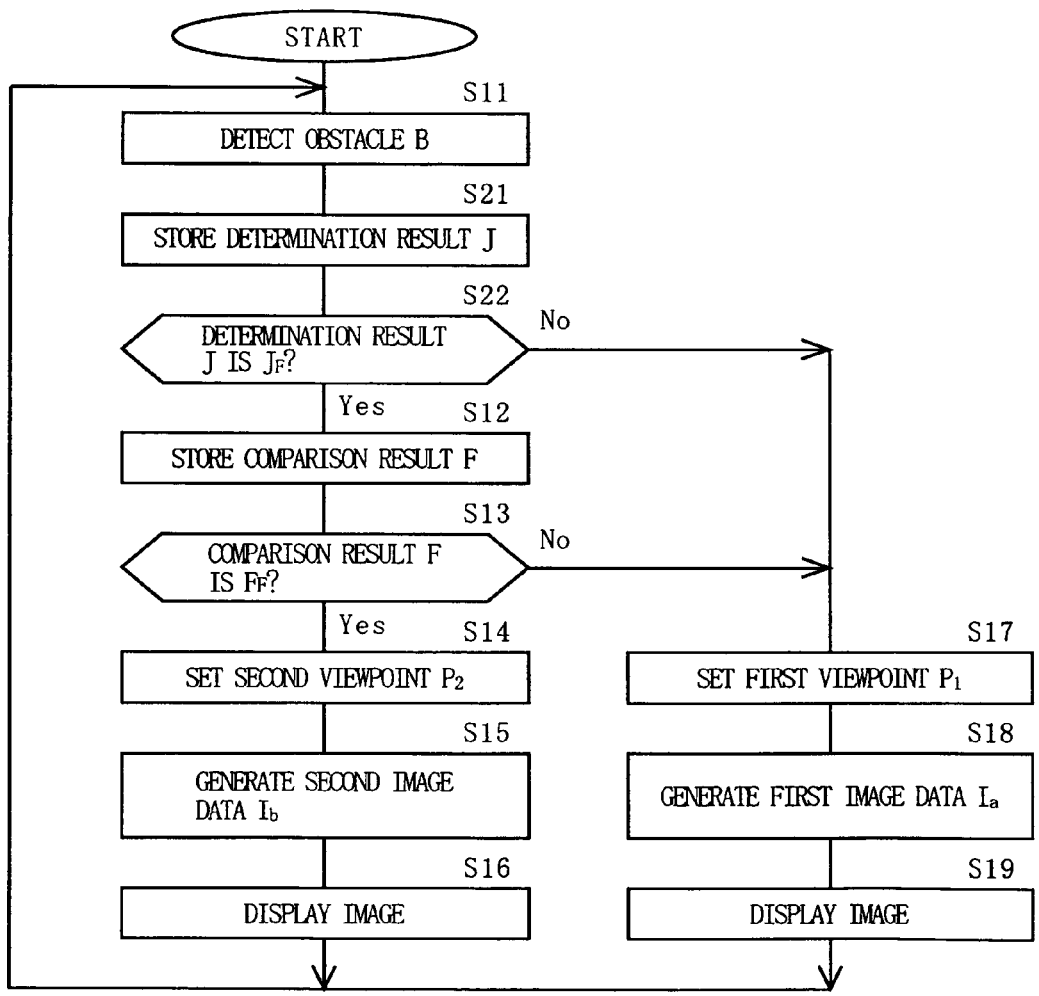
[FIG. 13]

Next, referring to a flowchart of FIG. 13, an operation of the vehicle surrounding display device 1a shown in FIG. 12 is described. The flowchart shown in FIG. 13 is different from that of FIG. 4 in that the flowchart shown in FIG. 13 further includes step S21 and step S22. There are no other differences between the two flowcharts. Therefore, in FIG. 13, like steps corresponding to those of FIG. 4 are denoted by like reference numerals, and the descriptions thereof are omitted.

Figure 14:
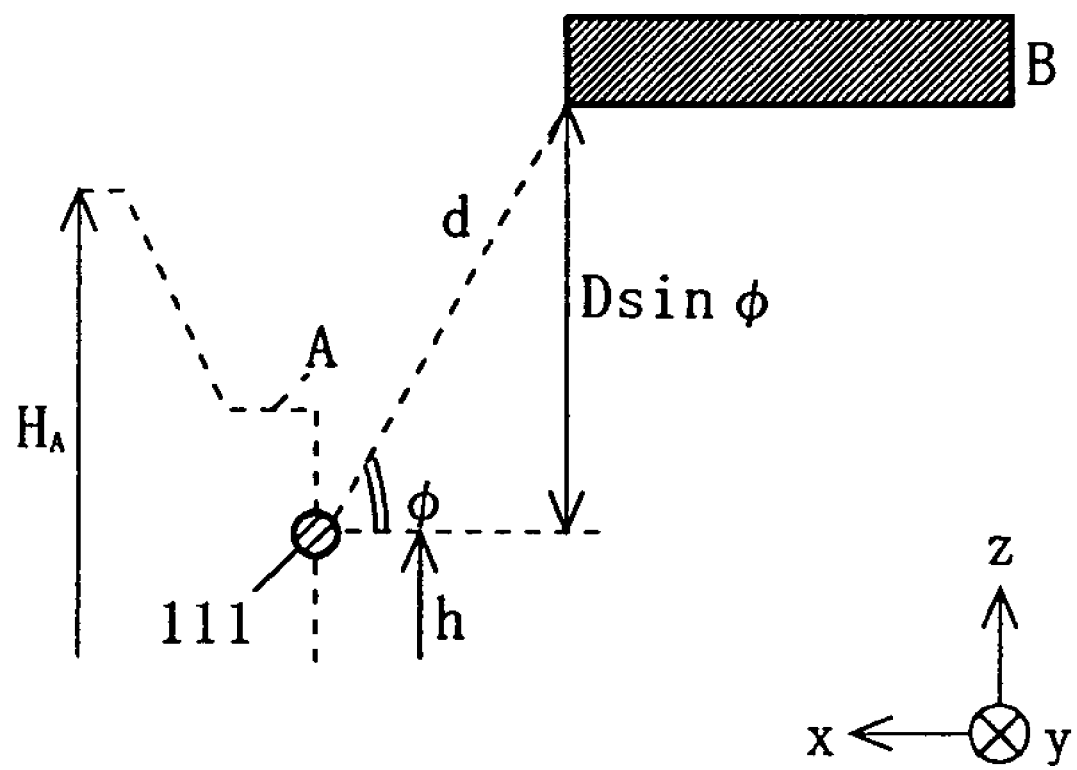
[FIG. 14]

After step S11, the contact determination section 21 derives the height $H_B$ from the ground to the bottom of the obstacle B shown in FIG. 14. The height $H_B$ is obtained by substituting a distance C and an elevation angle $\phi$, which are both currently stored in the RAM, and a height h of an adjacent active sensor 111 (included in mounting position data) into $H_B=h+D\cdot\sin\phi$. Thereafter, the contact determination section 21 compares the currently derived height $H_B$ with the height data $H_A$ of the vehicle A stored in the data accumulating section 21. When the height $H_B$ is larger, the contact determination section 16 determines that the vehicle A can pass under the obstacle B, and stores "$J_T$" in the RAM as the determination result J. On the other hand, when the height $H_B$ is not larger, "$J_F$" is stored in the RAM as the determination result J (step S21).

After step S21, the viewpoint determination section 13 determines whether the determination result J stored in the RAM is "$J_F$" (step S22). If it is determined Yes, it indicates that the vehicle A cannot pass under the obstacle B. Thus, the viewpoint determination section 13 performs the aforementioned steps from step S12 onward, in order to determine whether an image of a particular spot should be generated. On the other hand, if it is determined No in step S22, it indicates that the vehicle A can pass under the obstacle B. Thus, the viewpoint determination section 13 performs the aforementioned steps from step S17 onward.

The aforementioned determination is performed based on a height such that a driver can use the vehicle surrounding display device 1a in a situation, for example, where a vehicle is parked into a parking space, thus making it possible to provide the vehicle surrounding display device 1a having better usability.

In the present variant, a height $H_B$ from the ground to the bottom of the obstacle B may also be incorporated into an image of a particular spot.

(Second Variant)

Figure 15:
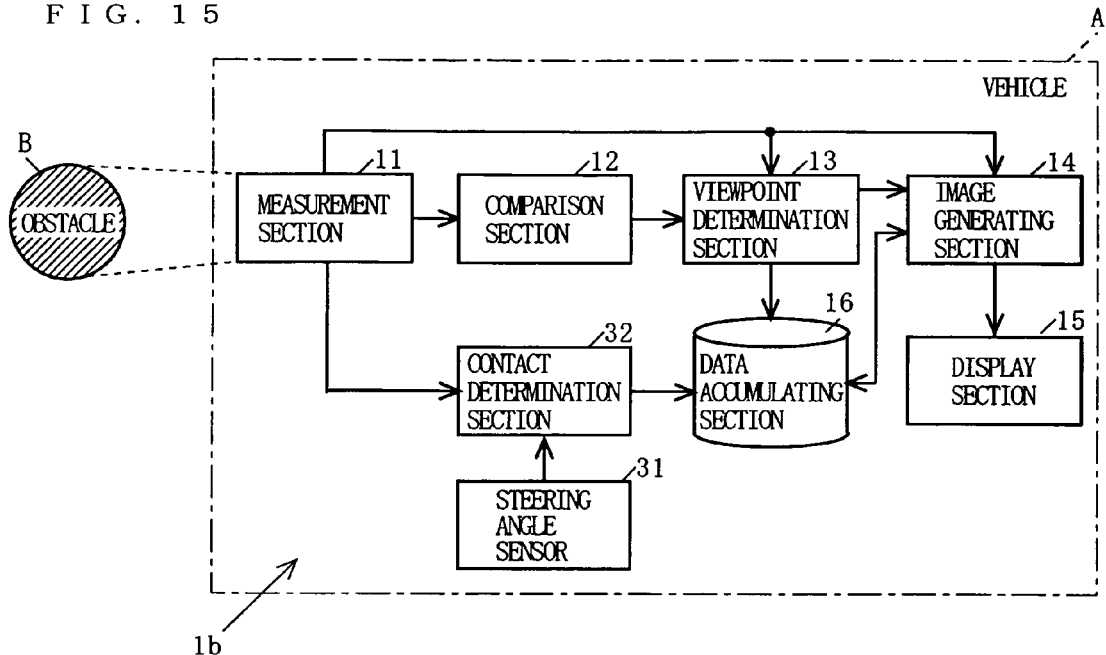
[FIG. 15]

FIG. 15 is a schematic diagram illustrating an example of a block configuration of the vehicle surrounding display device 1 according to a second variant (hereinafter, referred to as a vehicle surrounding display device 1b) of the present invention. In FIG. 15, the vehicle surrounding display device 1b is different from the vehicle surrounding display device 1 shown in FIG. 1 in that the vehicle surrounding display device 1b further includes a steering angle sensor 31 and a contact determination section 32. There are no other differences between the vehicle surrounding display devices 1 and 1b. Therefore, in FIG. 15, like elements corresponding to those of FIG. 1 are denoted by like reference numerals, and the descriptions thereof are omitted.

The steering angle sensor 31 detects a steering angle of the vehicle A, and passes a detected result to the contact determination section 32.

The contact determination section 32 derives a predicted trajectory through which the vehicle A is intended to move based on the detected result outputted from the steering angle sensor 31. Furthermore, the contact determination section 32 determines whether an obstacle B exists along the derived predicted trajectory based on a distance C and direction D, both stored in the RAM, between the vehicle A and the obstacle B. Thereafter, the contact determination section 32 generates a determination result K. In the present embodiment, when the obstacle B exists along the predicted trajectory, the contact determination section 32 stores "$K_T$" in the RAM as the determination result K; and when no obstacle B exists along the predicted trajectory, "$K_F$" is stored in the RAM as the determination result K.

The above contact determination section 32 also typically includes a combination of the CPU, the ROM, and the RAM.

Figure 16:
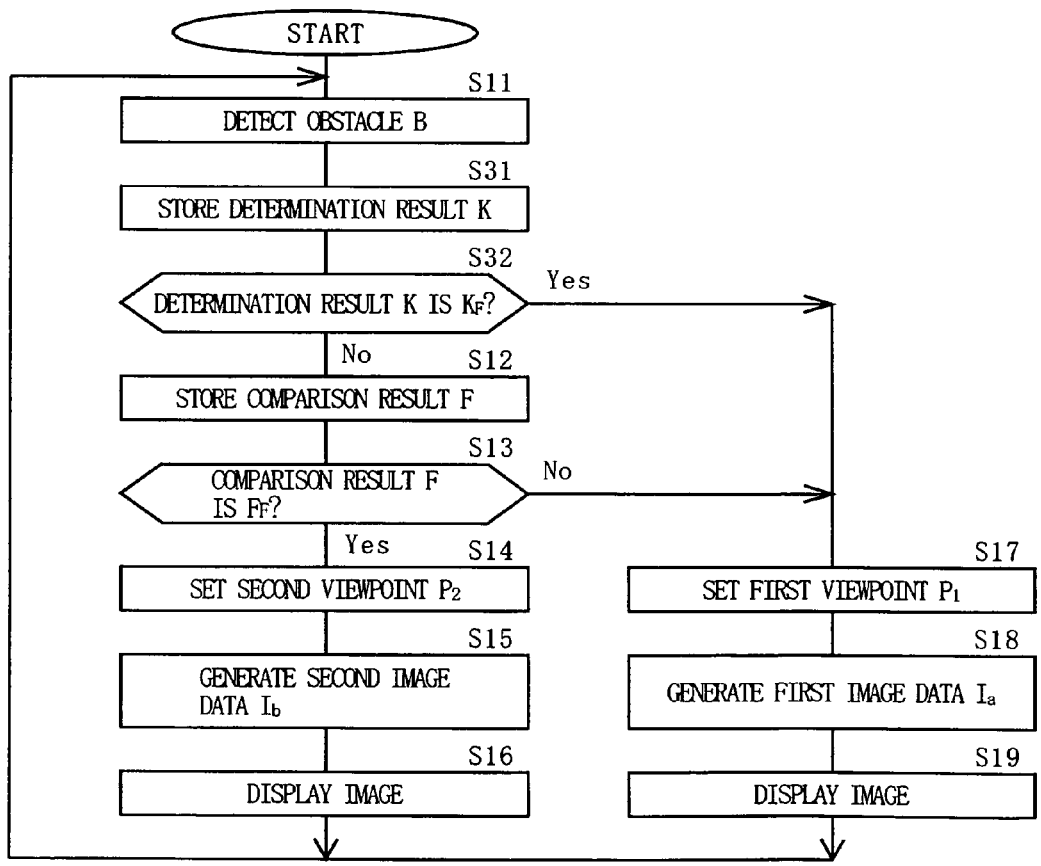
[FIG. 16]

Next, referring to a flowchart of FIG. 16, an operation of the vehicle surrounding display device 1b shown in FIG. 15 is described. The flowchart shown in FIG. 16 is different from that of FIG. 4 in that the flowchart shown in FIG. 16 further includes step S31 and step S32. There are no other differences between the two flowcharts. Therefore, in FIG. 16, like steps corresponding to those of FIG. 4 are denoted by like reference numerals, and the descriptions thereof are omitted.

After step S11, the contact determination section 32 derives the predicted trajectory of the vehicle A by means of a detected result outputted from the steering angle sensor 31. Furthermore, the contact determination section 32 determines whether the obstacle B exists along the derived predicted trajectory, and stores the determination result K ("$K_T$" or "$K_F$") in the RAM (step S31).

After step S31, the viewpoint determination section 13 determines whether the determination result K stored in the RAM is "$K_F$" (step S32). If it is determined Yes, it indicates that the obstacle B and the vehicle A are not likely to contact each other. Thus, the view point determination section 13 performs the aforementioned steps from step S17 onward. On the other hand, if it is determined No in step S32, it indicates that the obstacle B and the vehicle A are likely to contact each other. Thus, the viewpoint determination section 13 performs the aforementioned steps from step S12 onward, in order to determine whether an image of a particular spot should be generated.

The aforementioned determination is performed based on whether a contact is likely to occur such that a driver can use the vehicle surrounding display device 1b in a situation, for example, where a vehicle is parked into a parking space, thus making it possible to provide the vehicle surrounding display device 1b having better usability.

In the present variant, the predicted trajectory may also be incorporated into an image of a particular spot or a bird's eye image.

Figure 17A:
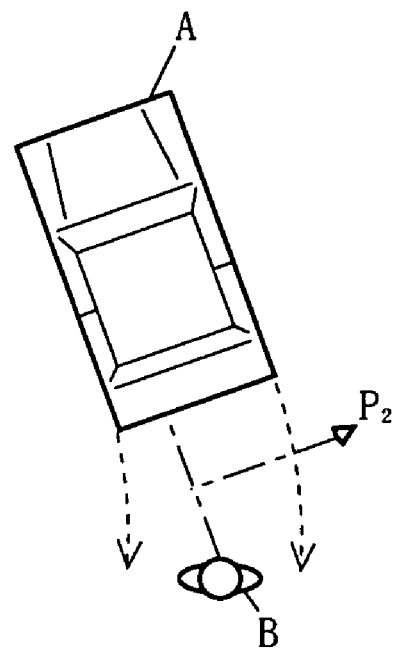
[FIG. 17A]

In the aforementioned embodiment, as shown in FIGS. 8A, 8B, and 9, the second viewpoints $P_2$ are set at two points. Even if either point is set as the second viewpoint $P_2$, the same effects can be obtained. In the present variant, however, the second viewpoint $P_2$ is preferably set as described below. That is, for example, as shown in FIG. 17A, when the obstacle B exists in the rear of the vehicle A which is moving backward, and a steering wheel of the vehicle A is turned to the left side (counterclockwise), a point on the right side of the vehicle A is to be set as the second viewpoint $P_2$.

Figure 17B:
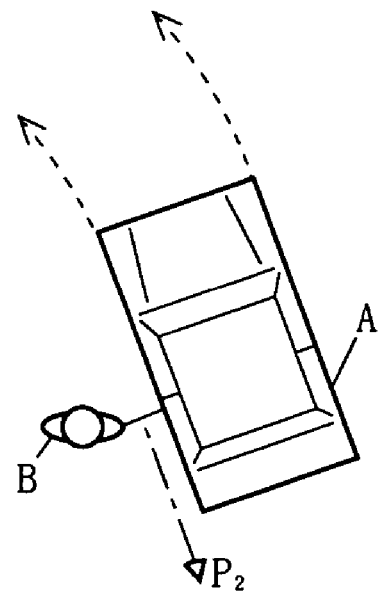
[FIG. 17B]
Figure 18:
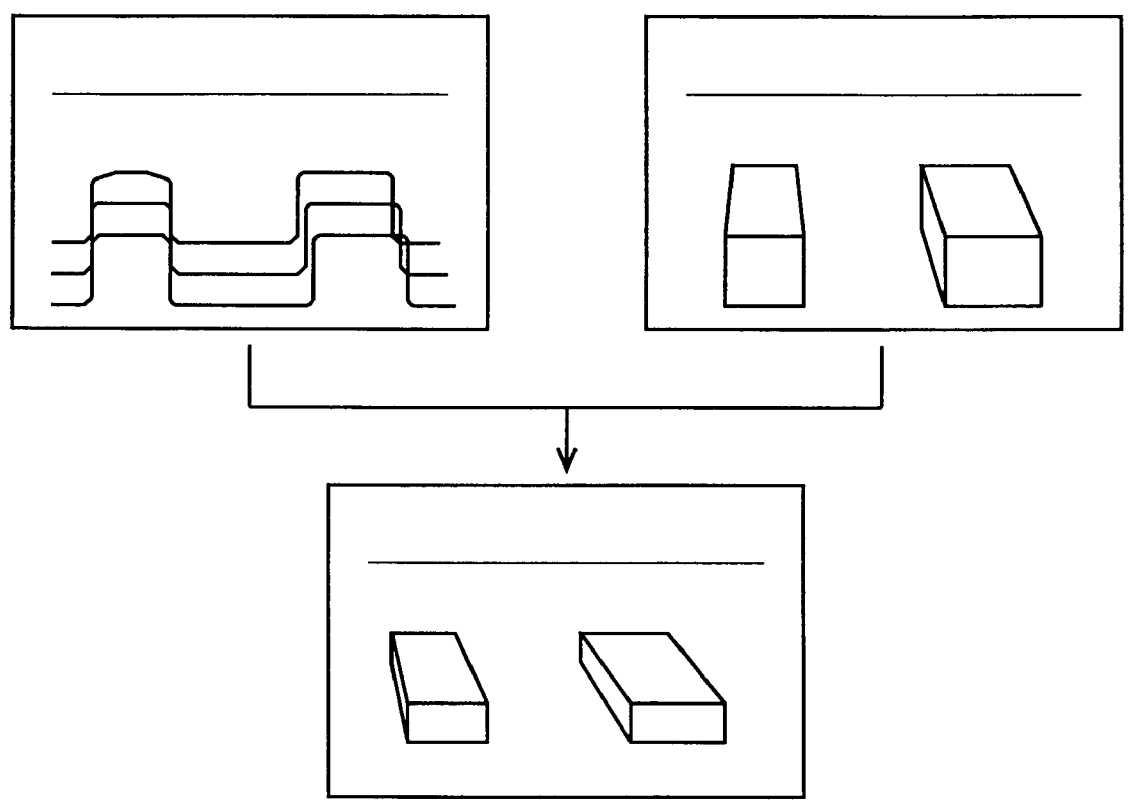
[FIG. 18]

Alternatively, as shown in FIG. 17B, when the obstacle B exists on the left side of the vehicle A which is moving forward, and the steering wheel of the vehicle A is turned to the left side, a point on the left side of the vehicle A is to be set as the second viewpoint $P_2$.

Thus, a second viewpoint $P_2$ is set in accordance with a direction of the obstacle B from the vehicle A, a traveling direction of the vehicle A, and an operating direction of a steering wheel. The second viewpoint $P_2$ is set in such a manner, thereby allowing the display section 15 to display how the vehicle A comes in proximity to the obstacle B. Thus, a driver can easily understand a positional relationship between the vehicle A and the obstacle B.

The above first and second variants may be incorporated together into the vehicle surrounding display device 1 according to the embodiments above.

While the invention has been described in detail, the foregoing description is in all aspects illustrative and not restrictive. It is understood that numerous other modifications and variations can be devised without departing from the scope of the invention.

INDUSTRIAL APPLICABILITY

A vehicle surrounding display device according to the present invention is applicable to a navigation device, a parking assist device or the like, which is required to display images such that a driver can more easily visually recognize an obstacle.

The invention claimed is:

1. A vehicle surrounding display device which selectively displays at least two types of images in a vicinity of a vehicle, the vehicle surrounding display device comprising:
    a measurement section for measuring a distance and a direction from the vehicle to an obstacle in the vicinity of the vehicle;
    a comparison section for comparing the distance measured by the measurement section with a predetermined threshold value;
    a viewpoint determination section for determining a predetermined first viewpoint when a comparison result generated by the comparison section indicates that the measured distance is larger than the threshold value, and for determining a second viewpoint based on the direction measured by the measurement section when the comparison result generated by the comparison section indicates that the measured distance is not larger than the threshold value;
    an image generating section for generating, when receiving the first viewpoint from the viewpoint determination section, a first image representing a view in the vicinity of the vehicle as seen from the received first viewpoint, and for generating, when receiving the second viewpoint from the viewpoint determination section, a second image representing a view of the vehicle and the obstacle as seen from an area in the vicinity of the received second viewpoint; and
    a display section for displaying one of the first image and the second image generated by the image generating section.

2. The vehicle surrounding display device according to claim 1, wherein
    the first viewpoint and the second viewpoint are represented by three-dimensional coordinate values, respectively, a horizontal direction component of the second view point is larger than a horizontal direction component of the first viewpoint, and a vertical direction component of the second viewpoint is smaller than a vertical direction component of the first viewpoint.

3. The vehicle surrounding display device according to claim 2, wherein
    the three-dimensional coordinate values of the first viewpoint are set at a point which is above the vehicle, and
    the three-dimensional coordinate values of the second viewpoint are set at a point having a predetermined depression angle which is formed between a horizontal plane and a line extending from the second viewpoint in a direction of the vehicle and the obstacle.

4. The vehicle surrounding display device according to claim 3, wherein
    the second viewpoint is set at a point contained in a vertical plane orthogonal to a line between the vehicle and the obstacle.

5. The vehicle surrounding display device according to claim 4, wherein
    the vertical plane is a plane which perpendicularly bisects the line between the vehicle and the obstacle.

6. The vehicle surrounding display device according to claim 1, further comprising a contact determination section for determining whether the vehicle is capable of moving without contacting the obstacle, wherein
    when the contact determination section determines that the vehicle is capable of moving without contacting the obstacle, the display section displays a third image different from the second image.

7. The vehicle surrounding display device according to claim 6, wherein
    the measurement section further measures a height of the obstacle, and
    the contact determination section determines whether the vehicle is capable of moving without contacting the obstacle based on the height of the obstacle.

8. The vehicle surrounding display device according to claim 6, further comprising a steering angle detecting section for detecting a steering angle of the vehicle, wherein
    the contact determination section determines whether the vehicle is capable of moving without contacting the obstacle based on the steering angle detected by the steering angle detecting section.

9. The vehicle surrounding display device according to claim 8, wherein
    when the contact determination section determines that the vehicle is capable of moving without contacting the obstacle, the viewpoint determination section additionally determines the second viewpoint based on the steering angle detected by the steering angle detecting section.

10. The vehicle surrounding display device according to claim 9, wherein
the second viewpoint is set at three-dimensional coordinate values such that a driver can visually recognize both the obstacle and a spot, on the vehicle, to contact the obstacle.

11. The vehicle surrounding display device according to claim 1, further comprising a selecting section for selecting, when the measurement section measures a plurality of distances and directions of obstacles, one distance and one direction of an obstacle which are most likely to contact the vehicle, wherein
the comparison section compares the distance selected by the selecting section with a predetermined threshold value, and
the viewpoint determination section determines the second viewpoint based on the direction selected by the selecting section, when the comparison result generated by the comparison section indicates that the measured distance is not larger than the threshold value.

12. The vehicle surrounding display device according to claim 1, further comprising a plurality of active sensors mounted at any of a front part, a rear part, a right side part or a left side part of the vehicle, wherein
each of the active sensors detects for an obstacle in the vicinity of the vehicle.

13. A vehicle surrounding display method for causing a display device to selectively display at least two types of images in a vicinity of a vehicle, the vehicle surrounding display method comprising:
a measurement step of measuring a distance and a direction from the vehicle to an obstacle in the vicinity of the vehicle;
a comparison step of comparing the distance measured by the measurement step with a predetermined threshold value;
a viewpoint determination step of determining a predetermined first viewpoint when a result received from the comparison step indicates that the measured distance is larger than the threshold value, and determining a second viewpoint based on the distance measured by the measurement step when the result received from the comparison step indicates that the measured distance is not larger than the threshold value;
a image generating step of generating, when receiving the first viewpoint from the viewpoint determination step, a first image representing a view in the vicinity of the vehicle as seen from the first viewpoint, and generating, when receiving the second viewpoint from the viewpoint determination step, a second image representing a view of the vehicle and the obstacle as seen from an area in the vicinity of the second viewpoint; and
a display step of displaying one of the first image and the second image generated by the image generating step.

14. A computer program recorded on a computer-readable medium for causing a display device to selectively display at least two types of images around a vehicle, the computer program comprising:
a measurement step of measuring a distance and a direction from the vehicle to an obstacle in a vicinity of the vehicle;
a comparison step of comparing the distance measured by the measurement step with a predetermined threshold value;
a viewpoint determination step of determining a predetermined first viewpoint when a result received from the comparison step indicates that the measured distance is larger than the threshold value, and determining a second viewpoint based on the distance measured by the measurement step when the result received from the comparison step indicates that the measured distance is not larger than the threshold value;
a image generating step of generating, when receiving the first viewpoint from the viewpoint determination step, a first image representing a view in the vicinity of the vehicle as seen from the first viewpoint, and generating, when receiving the second viewpoint from the viewpoint determination step, a second image representing a view of the vehicle and the obstacle as seen tiom an area in the vicinity of the second viewpoint; and
a display step of displaying one of the first image and the second image generated by the image generating step.

* * * * *